Dec. 11, 1951  S. GATTUSO  2,577,959
FOOD STORAGE DEVICE
Filed Aug. 11, 1949
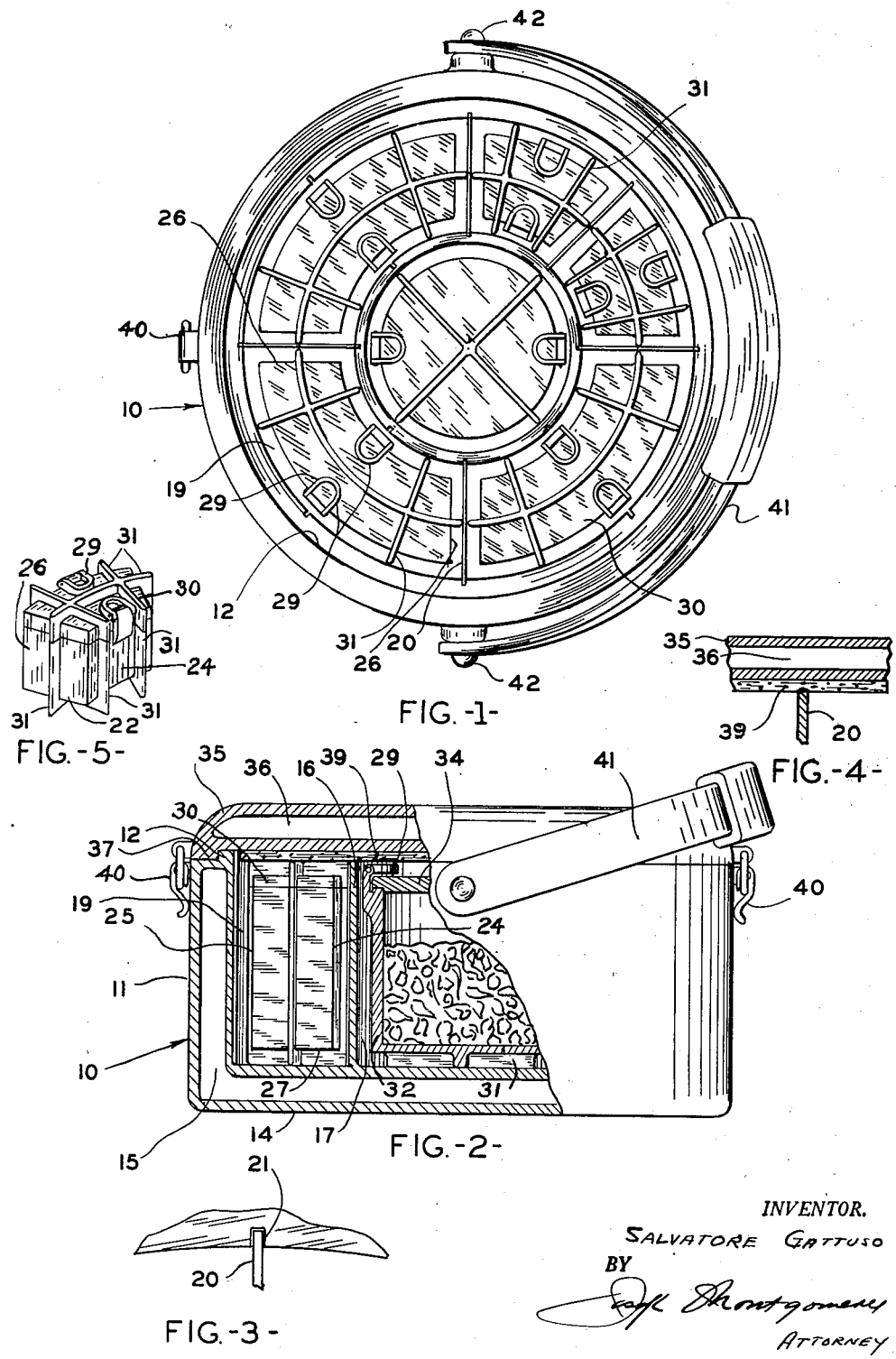
INVENTOR.
SALVATORE GATTUSO
BY
ATTORNEY Patented Dec. 11, 1951

2,577,959

UNITED STATES PATENT OFFICE 2,577,959

FOOD STORAGE DEVICE

Salvatore Gattuso, Ozone Park, N. Y.

Application August 11, 1949, Serial No. 109,644

6 Claims. (Cl. 220—15)

This invention relates to food storage devices, and is particularly directed to devices of the portable type adapted to maintain the food at a desired temperature.

Accordingly, an object of the present invention is to provide a food storage device which is simple and practical in construction and which is efficiently thermally insulated.

Another object is to provide such a device wherein a portable container has a plurality of storage spaces for receiving individual receptacles adapted to contain a variety of foods.

Another object is to provide such a device wherein the receptacles are separately covered and the spaces are sealed to prevent circulation of odors from one space to another.

Another object is to provide such a device wherein removable partitions subdivide spaces therein to receive receptacles of various sizes.

Another object is to provide such a device wherein the receptacles have means for spacing the walls thereof from the walls of the container and the partitions to reduce the flow of heat therebetween.

A further object is to provide such a device wherein the container is effectively sealed and is adapted for carrying.

A still further object is to provide devices having the foregoing characteristics and which are suitable for use by caterers, picnickers, as well as for home, industrial and other uses.

Other and further objects of the invention will be manifest from the following description and the accompanying drawing.

In accordance with the invention, the foregoing objects are accomplished by providing a food storage device comprising a container having heat insulated side and bottom walls and an upstanding, continuous interior wall spaced from the side wall, one or more upright partitions removably positioned between the side and interior walls to divide the container into a plurality of spaces, a receptacle in each of the spaces having side and bottom walls and a removable cover member, each of the receptacles being formed with outwardly extending spacing means, such as ribs or fins, and a heat insulated cover for the container having sealing means on the underside thereof for engaging the upper edges of the partitions and the interior wall.

In an illustrative embodiment of the invention about to be described, the container may have cylindrical side and interior walls forming a central cylindrical space and an annular space surrounding the central space. The partitions may be radially positioned between the side and interior walls to subdivide the annular space whereby a neat, compact and attractive receptacle arrangement is provided.

The receptacles which are adapted to be disposed in the spaces defined by the removable partitions may be of different sizes, whereby different quantities of different foods may be stored. The provision of this arrangement permits the storage in a single receptacle of some foods of which larger quantities are desired than other foods which may be stored in smaller receptacles. When the receptacles have been filled with their respective foods and each receptacle has its cover in place, they are lowered into the spaces, the cover placed on the device and clamped in position, with the upper edges of the partitions securely engaging the sealing means of the cover.

As will be understood from the following description, a complete meal for a number of persons may be stored in the device, and the device carried from place to place, as desired.

In the drawing:

Fig. 1 is a top view of a device in accordance with the invention with the cover removed to illustrate the interior;

Fig. 2 is a side view, partly in section and partly in elevation, of the device shown in Fig. 1, with the cover applied;

Fig. 3 is an enlarged fragmentary plan view illustrating in detail the manner of positioning the partitions;

Fig. 4 is an enlarged fragmentary elevational view illustrating the manner in which the top edges of the partitions engage the cover; and Fig. 5 is a perspective view of a receptacle, illustrating the spacing means on the exterior thereof.

Referring to the drawing in detail, and particularly to Figs. 1 and 2 thereof, there is shown a generally cylindrical container 10 comprising a cylindrical side wall 11 formed with an upwardly projecting annular rib 12 at the upper open end thereof, and a circular bottom wall 14, preferably formed integrally with the side wall. The side and bottom walls are formed of material having a relatively low heat conductivity and are hollow to provide a space 15 adapted to be evacuated to more effectively thermally insulate these walls.

The container 10 has an interior cylindrical wall or partition 16 projecting upwardly from the bottom wall and positioned concentrically with the side wall to provide a central cylindrical space or well 17 and an annular space 19 surrounding the central space.

The annular space 19 is subdivided into annular sector shaped compartments or spaces by partitions 20 removably positioned between the walls 11 and 16 and extending radially across the annular space. Preferably, the partitions have their ends mounted in radially opposite upright slots or recesses 21 formed in opposite surfaces of the walls 11 and 16. These slots are spaced circumferentially about forty-five degrees apart to enable the annular space to be subdivided into eight compartments or less, depending upon the sizes of compartments desired. While I have illustrated and described the slots so spaced as to provide eight compartments or less, it is to be understood that the slots may be differently spaced to provide any desired number of compartments. The slots are arranged to tightly receive the removable partitions which extend from the interior of the bottom wall to about the upper edge of the interior wall 16. One of these slots 21 and an end of a partition 20 are illustrated in detail in Fig. 3.

The subdivided annular spaces or compartments are each adapted to receive receptacles 22 conforming substantially to the size and shape thereof. These receptacles are generally in the shape of sectors having upright arcuate inner and outer side walls 24 and 25, respectively, upright end side walls 26, and a bottom wall 27. As shown, the receptacles 22 may extend circumferentially either forty-five or ninety degrees so that various arrangements of receptacles 22 may be provided by arranging the partitions 20 accordingly. The receptacles may have opposite handle members 29 which are hinged on the walls 24 and 25 to facilitate placing the receptacles into the spaces and removing them therefrom, and are adapted to be folded downwardly and inwardly as shown in Figs. 1 and 2.

Each of the receptacles has a cover member 30 supported on the upper end thereof which conforms to the top opening of the respective receptacles and is adapted to be held in place by the handle members 29 when folded downwardly and inwardly.

In order to house the receptacles 22 in the compartments with a minimum of heat transfer between the receptacles and their covers and the walls 11, 14 and 16, and the partitions 20, each receptacle and its cover has spacing outwardly extending means thereon to provide for a minimum of contact area between the receptacles and the respective walls.

As shown in Fig. 5 these spacing means may be in the form of fins 31 arranged in any suitable manner. In a preferred embodiment of the invention the bottom wall 27 and cover 30 have a circumferentially extending fin and a pair of radial fins, the walls 24 and 25 have a pair of upright fins merging with the radial fins and the walls 26 have an upright fin merging with the circumferentially extending fin.

The central space 17 is adapted to receive a cylindrical receptacle 32 conforming substantially to the size thereof, which is provided with diametrically opposite handle members 29 and a circular cover member 34. Like the receptacles 22, the receptacle 32 is provided with fin means 31 for spacing the same from the inner surface of the wall 16 and the inner portion of the bottom wall 14 of the container. While the arrangement of the fins 31 may vary, preferably the bottom and cover of the receptacle have a pair of diametrically extending fins, and the side wall of the receptacle has upright fins meeting the diametrically extending fins.

The container 10 is provided with a heat insulated cover 35 having an evacuated space 36 therein and having an annular rib 37 surrounding the container rib 12 to provide an effective sealing joint. The underside of the cover 35 has a disc 39 of sealing material, such as a sheet of cork, thereon which engages the fins 31 of the cover members 30 and 34, whereby to aid in retaining the cover members in place. The sealing material 39 also engages the upper edges of the partitions 20 and the upper edge of the wall 16 to isolate the various spaces from each other and thereby prevent food odors from passing from one space to another. The cork disc also improves the heat insulating effect of the cover to minimize heat transfer between the interior of container and the atmosphere.

The cover 35 for the container may be secured thereon in any suitable manner as for example, by hasps 40.

To facilitate carrying of the container, a handle or bail 41 may be pivotally mounted on diametrically opposite trunnions 42.

From the foregoing description, it will be seen that the present invention provides a food storage device which is simple and practical in construction, is efficiently heat insulated, is extremely attractive in appearance, and can be utilized advantageously for a great variety of purposes. The device has a larger number of individual spaces, the size and number of which may be conveniently varied. These spaces are isolated from each other and receive individual, separately covered receptacles which are readily uncovered and removed to attain access to the food therein. These receptacles and their covers are provided with means to minimize heat transfer which greatly improve the overall heat insulating properties of the device.

While I have illustrated and described a preferred embodiment of my invention, it is to be understood that various modifications and changes may be made therein without departing from the spirit and scope of the invention.

What I claim is:

1. In a food storage device, the combination of a container having heat insulated side and bottom walls and an upstanding, continuous interior wall spaced from said side wall, a plurality of receptacles between said side and interior walls having side and bottom walls provided with outwardly extending spacing means, a removable cover member for each of said receptacles provided with outwardly extending spacing means, and a removable heat insulated cover member for said container having sealing means on the underside thereof engageable with the spacing means on said cover members to hold the latter on the related receptacles.

2. In a food storage device, the combination of a container having heat insulated side and bottom walls and an upstanding, continuous interior wall spaced from said side wall, an upright partition removably positioned between said side and interior walls to divide said container into a plurality of spaces, a receptacle for each of said spaces having side and bottom walls provided with outwardly extending spacing means, a removable cover member for each of said receptacles provided with outwardly extending spacing means, and a removable heat insulated cover for said container having sealing means on the underside thereof engageable with the upper edge of said partition to seal the spaces in the container relative to each other and with the spacing means of said receptacle cover member to hold the latter on the receptacle.

3. In a food storage device, the combination of a container having a heat insulated cylindrical side wall and a heat insulated bottom wall and having an interior cylindrical wall concentric with said side wall to provide a central cylindrical space and an annular space surrounding said central space, a plurality of upright partitions removably positioned between said side and interior walls to subdivide said annular space into a plurality of spaces, a receptacle in said central space, a receptacle in each of said subdivided spaces of said annular space, said receptacles having side and bottom walls provided with outwardly extending spacing means, a removable cover member for each of said receptacles provided with outwardly extending spacing means, and a removable heat insulated cover for said container having sealing means on the underside thereof, engageable with the upper edges of said partitions to seal the spaces in the container relative to each other and with said spacing means of said receptacle cover members to hold the latter on the related receptacles.

4. In a food storage device, the combination of a container having a heat insulated cylindrical side wall and a heat insulated bottom wall and having an interior cylindrical wall concentric with said side wall to provide a central cylindrical space and an annular space surrounding said central space, said side and interior walls having upright radially aligned slots at opposite surfaces thereof, a plurality of upright radial partitions having their ends removably positioned in said slots in said side and interior walls to subdivide said annular space into a plurality of spaces, a cylindrical receptacle in said central space, a receptacle in each of said spaces of said annular space conforming to the shape of said spaces, and a heat insulated cover for said container having sealing means on the underside thereof for engaging the upper edges of said partitions and the upper edge of said interior wall, said receptacles having side and bottom walls and each having a removable cover member providing a top wall, said cylindrical receptacle having outwardly projecting radial fins on said top and bottom walls engaging said sealing means on the container cover and bottom wall, respectively, so that said sealing means holds the cover member on said cylindrical member and having outwardly projecting upright fins on said side wall engaging said interior container wall to space said cylindrical receptacle from the latter, said receptacles in said annular spaces having outwardly projecting circumferential and radial fins on their cover members and bottom walls engaged by said sealing means on the container cover and engaging said container bottom wall, respectively, and having outwardly projecting upright fins on said side walls engaging said interior container wall and said container side wall to space the receptacles in said annular spaces from said interior container wall and said container side wall.

5. In a food storage device, the combination of a container having a heat insulated cylindrical side wall and a heat insulated bottom wall and having an interior cylindrical wall concentric with said side wall to provide a central cylindrical space and an annular space surrounding said central space, said side and interior walls having upright radially aligned slots at opposite surfaces thereof, a plurality of upright radial partitions having their ends removably positioned in said slots in said side and interior walls to subdivide said annular space into a plurality of spaces, a cylindrical receptacle in said central space, a receptacle in each of said spaces of said annular space conforming to the shape of said spaces, a heat insulated cover for said container having sealing means on the underside thereof for engaging the upper edges of said partitions and the upper edge of said interior wall, said receptacles having side and bottom walls and each having a removable cover member providing a top wall, said cylindrical receptacle having outwardly projecting radial fins on said top and bottom walls engaged by said sealing means on the container cover and engaging said container bottom wall, respectively, and having outwardly projecting upright fins on said side wall engaging said interior container wall, said receptacles in said annular spaces having outwardly projecting circumferential and radial fins on said top and bottom walls engaged by said sealing means on the container cover and engaging said container bottom wall, respectively, and having outwardly projecting fins on their side walls engaging said interior container wall and said container side wall, a carrying handle for said container, and means for securing said container cover to said container in sealed relation thereto.

6. In a food storage device, the combination of a container having upstanding partitions therein to define a plurality of upwardly opening spaces, a receptacle fitting in each of said spaces and formed with outwardly extending fins on the side and bottom walls for spacing the receptacle from the container structure defining the related space, a receptacle cover for closing each receptacle and formed with upwardly projecting fins, and a container cover having sealing means on the underside thereof engaging the upper edges of the partitions and the fins on the receptacle covers to thereby seal the spaces relative to each other and hold the receptacle covers on the receptacles.

SALVATORE GATTUSO.

REFERENCES CITED

The following references are of record in the file of this patent:

UNITED STATES PATENTS

| Number | Name | Date |
| --- | --- | --- |
| 354,659 | Seidel | Dec. 21, 1886 |
| 1,006,135 | Schleicher | Oct. 17, 1911 |
| 1,716,367 | Clayton | June 11, 1929 |
| 2,097,186 | Hinnerkamp | Oct. 26, 1937 |
| 2,125,856 | De Witt | Aug. 2, 1938 |
| 2,373,611 | Steven | Apr. 10, 1945 |
| 2,415,767 | Shaw | Feb. 11, 1947 |